United States Patent [19]

Sielfeld et al.

[11] 4,368,307

[45] Jan. 11, 1983

[54] PROCESS FOR THE PRODUCTION OF VINYL CHLORIDE POLYMERS

[75] Inventors: Gilbert Sielfeld; Paul Sunder-Plassmann, both of Marl, Fed. Rep. of Germany

[73] Assignee: Chemische Werke Huls AG, Marl, Fed. Rep. of Germany

[21] Appl. No.: 301,270

[22] Filed: Sep. 11, 1981

[30] Foreign Application Priority Data

Sep. 25, 1980 [DE] Fed. Rep. of Germany ....... 3036101
Sep. 25, 1980 [DE] Fed. Rep. of Germany ....... 3036127

[51] Int. Cl.$^3$ .............................................. C08F 2/00
[52] U.S. Cl. ................................... 526/202; 526/200; 526/201; 526/344.2
[58] Field of Search ......................... 526/200, 201, 202

[56] References Cited

U.S. PATENT DOCUMENTS 3,597,343 8/1971 Delzenne et al. ............. 204/159.23
3,817,963 6/1974 Baline et al. ...................... 260/17 R

FOREIGN PATENT DOCUMENTS 1263300 10/1965 Fed. Rep. of Germany.
991134 5/1965 United Kingdom.
1541386 2/1979 United Kingdom.

OTHER PUBLICATIONS

"Chemical Reviews", 1971, vol. 71, No. 5, Frump, p. 496.

Primary Examiner—J. L. Schofer
Assistant Examiner—Bernard Lipman
Attorney, Agent, or Firm—Millen & White

[57] ABSTRACT

In a process for preparing a vinyl chloride resin by polymerizing vinyl chloride alone or with up to 20% by weight of other polymerizable unsaturated monomers, in an aqueous suspension, in the presence of a monomer-soluble free radical catalyst and a suspension stabilizer which is partially hydrolyzed polyvinyl acetate or cellulose ether, there is an improvement wherein the polymerization is conducted in the presence of 0.02–0.3% by weight, based on the amount of monomer to be polymerized, of a cosuspension stabilizer which is a copolymer of 2-n-propyl-$\Delta^2$-oxazoline, 2-isopropyl-$\Delta^2$-oxazoline or both and 2-methyl-$\Delta^2$oxazoline, 2-ethyl-$\Delta^2$-oxazoline or both, the copolymer having a viscosity number of 35–70 (ml/g), measured at 25° C. in an isopropanol/water mixture (50 vol-% of isopropanol), in a concentration of 0.5% (weight/volume of the solution).

13 Claims, No Drawings

PROCESS FOR THE PRODUCTION OF VINYL CHLORIDE POLYMERS

BACKGROUND OF THE INVENTION

In producing polyvinyl chloride by the suspension polymerization method, the monomer or monomer mixture is finely distributed in the aqueous phase by mechanical agitation, stabilized with the aid of protective colloids, and polymerized in the presence of free radical initiators. Suitable as protective colloids or suspension stabilizers are water-soluble, natural polymeric compounds, such as starch (amylose), gelatin, and the like; water-soluble cellulose derivatives, such as alkyl celluloses, hydroxyalkyl celluloses, and the like; water-soluble synthetic products, such as partially saponified polyvinyl acetates, copolymers of maleic acid anhydride and vinyl acetate, and also various combinations of the aforementioned substances.

Polyvinyl chloride resins produced with the mentioned suspension stabilizers are suitable for hard processing (processing into rigid components); but in soft processing (plasticizer-enhanced processing, processing into soft components), due to an unsatisfactory absorption of plasticizer, they produce finished parts having a large number of so-called gels or fisheyes. Furthermore, due to the low granular porosity of the products, the residual monomer can be removed only by expensive and difficult procedures. To counteract these disadvantages, surfactants have been added as porosity-enhancing agents, such as sorbitan monolaurate, for example (DOS [German Unexamined Laid-Open Application] 2,208,796). However, polyvinyl chloride resins manufactured according to this process still have an excessively high gel content (fisheyes), especially if the polyvinyl chloride resin is processed with a highly viscous plasticizer. In addition, such products still have porosity inadequate for conducting a vinyl chloride degasification step in a simple way. Moreover, the use of tensides, such as the above-mentioned sorbitan monolaurate, leads to products having unsatisfactory electric resistance values.

In suspension-polymerized polyvinyl chloride resins prepared by conventional processes, an interdependence exists between the porosity and the bulk density. An increase in porosity for the purpose of a satisfactory removal of monomers entails a reduction of the bulk density. However, a decrease in bulk density means a reduction in output of extruded polyvinyl chloride resin.

SUMMARY OF THE INVENTION

Accordingly, it is an object of this invention to provide a process for suspension polymerizing polyvinyl chloride and optionally other monomers in which the foregoing disadvantages are ameliorated or eliminated.

Upon further study of the specification and appended claims, further objects and advantages of this invention will become apparent to those skilled in the art.

These objects have been achieved by providing a process for preparing vinyl chloride polymers by polymerizing vinyl chloride alone with up to 20% by weight of other polymerizable, unsaturated monomers, in an aqueous suspension, in the presence of monomer-soluble free radical catalysts and polyvinyl alcohols and/or cellulose ethers as suspension stabilizers, which comprises polymerizing in the presence of 0.01-0.5% by weight, based on the amount of monomer, of a cosuspension stabilizer which is a 2-propyl-$\Delta^2$-oxazoline copolymer, or copolymer mixture, having a viscosity number of 35-70 (ml/g) measured at 25° C. in an isopropanol/water mixture (50 vol-% of isopropanol) in a concentration of 0.5% (weight/volume of the solution).

DETAILED DISCUSSION

By a 2-propyl-$\Delta^2$-oxazoline copolymer is meant, herein, a copolymer built up of 75-93 mole % of 2-isopropyl-$\Delta^2$-oxazoline and/or 2-n-propyl-$\Delta^2$-oxazoline, on the one hand, and 25-7 mole % of 2-methyl-$\Delta^2$-oxazoline and/or 2-ethyl-$\Delta^2$-oxazoline, on the other.

In a preferred embodiment of this process, the suspension stabilizer is 0.02-0.2% by weight, based on the amount of monomer, of a partially hydrolyzed polyvinyl acetate having a degree of hydrolysis of 70-90 mol-% and a viscosity of 2-50 mPa.s, measured in a 4% by weight aqueous solution at 20° C.

In another preferred embodiment of this process, the suspension stabilizer is 0.02-0.3% by weight, based on the amount of monomer, of methyl-, methylhydroxyethyl-, or methylhydroxypropyl- celluloses with a viscosity of 12-120 mPa.s, measured in a 2% aqueous solution at 20° C.

In an especially recommended embodiment of the process of this invention, the cosuspension stabilizer is a copolymer of 78-93 mole % of 2-isopropyl-$\Delta^2$-oxazoline and 22-7 mole % of 2-ethyl-$\Delta^2$-oxazoline and/or a copolymer of 75-93 mole % of 2-isopropyl-$\Delta^2$-oxazoline and 25-7 mole % of 2-methyl-$\Delta^2$-oxazoline.

In another, especially preferred embodiment of this process, the cosuspension stabilizer is a copolymer of 87-95 mole % of 2-n-propyl-$\Delta^2$-oxazoline and 13-5 mole % of 2-ethyl-$\Delta^2$-oxazoline and/or a copolymer of 77-95 mole % of 2-n-propyl-$\Delta^2$-oxazoline and 23-5 mol % of 2-methyl-$\Delta^2$-oxazoline.

Especially advantageous are copolymers of 75-85 mole % of 2-isopropyl-$\Delta^2$-oxazoline and 25-15 mole % of 2-methyl-$\Delta^2$-oxazoline.

Furthermore, especially suitable are copolymers of 77-87 mole % of 2-n-propyl-$\Delta^2$-oxazoline and 23-13 mole % of 2-methyl-$\Delta^2$-oxazoline.

The 2-propyl-$\Delta^2$-oxazoline copolymers to be utilized according to this invention have a viscosity number of 35-70 (ml/g), preferably 40-65 (ml/g), measured at 25° C. in an isopropanol/water mixture (50 vol-% of isopropanol), in a concentration of 0.5% (weight/volume of the solution).

These copolymers can be produced according to the procedures of German Pat. No. 1,263,300, or according to the mode of operation described, e.g., in Example 1a herein, which is based on German patent application P 30 36 119.4, corresponding to U.S. application Ser. No. 301,269, filed on Sept. 11, 1982. All of these disclosures are incorporated by reference herein.

For example, the latter reference discloses in a process for preparing a linear or slightly branched 2-($C_1$ to $C_3$ alkyl)-$\Delta^2$-oxazoline copolymer from a mixture of monomers more than 50 mole % of which is 2-(isopropyl- and/or n-propyl)-$\Delta^2$-oxazoline and less than 50 mole % of which is 2-(methyl- and/or ethyl)-$\Delta^2$-oxazoline, the copolymer having a viscosity number of 35 to 70 ml/g which is easily reproducible from batch to batch, comprising polymerizing the monomers in the presence of a cation-active catalyst whose anion is slightly nucleophilic, the improvement wherein, (A) the monomers used as reagents contain less than 200 mg of water per liter of reagent and less than 0.003% by weight of basic nitrogen, the monomers being obtained by the following purification steps:

(i) fractional distillation, optionally carried out after preaddition to the monomer reagent of an inert, organic solvent which acts as an entraining agent for impurities and which has a boiling point at least 15° C. lower at normal pressure than the monomer reagent, and optionally carried out at reduced pressure, which method can be applied to all monomers, or addition of an inert, organic solvent which acts as an entraining agent for impurities and which has a boiling point at least 15° C. lower at normal pressure than the monomer reagent; followed by distillation to extensively remove this solvent; subsequently followed by addition to the resultant sump product of from 0.01 to 2 parts by weight, referred to 100 parts by volume of the monomer reagent, of an aromatic isocyanate boiling at above 100° C./7 mbar; and ensuing fractional distillation at reduced pressure, which method can only be applied to 2-isopropyl-$\Delta^2$-oxazoline monomer reagent;

(ii) subsequent contact with silica gel or neutral aluminum oxide, and (iii) optional drying above molecular sieve having a pore width of 0.3 to 0.4 nm;

(B) the polymerization is discontinuous and is carried out in a stirring vessel provided with a reflux condenser adequately dimensioned to remove the heat of polymerization by evaporative cooling; (C) the polymerization temperature is from 120° to 175° C., and the temperature following the conversion of 90 mole-% of the monomers does not exceed 165° C., and (D) the polymerization is stopped after a conversion of 96 to 99.5 mole-% of monomers has been reached.

Unless noted otherwise herein, all details of the basic suspension polymerization of this invention are fully conventional and are disclosed, e.g., in Helmut Kainer, Polyvinylchlorid und Vinylchlorid-Mischpolymerisate, Springer-Verlag, Berlin/Heidelberg/New York, (1965), S. 12-34, whose disclosure is incorporated by reference herein.

Suitable protective colloids include the water-soluble, high-molecular weight compounds usually employed in such polymerizations, such as partially saponified polyvinyl acetates and cellulose ethers. The partially hydrolyzed polyvinyl acetates can have a degree of hydrolysis of up to 90 mole %. Suitable cellulose ethers include methyl-, methylhydroxyethyl-, methylhydroxypropyl-, hydroxypropylcelluloses, etc. and also various combinations of the aforementioned materials. The protective colloids are ordinarily used in an amount of from 0.02 to 0.3% by weight, based on the amount of monomer to be polymerized.

The amount of the oxazoline copolymer to be used in conjunction with the protective colloids depends on the type and quantity of the protective colloid and varies in the range of 0.5 to 0.01% by weight, preferably 0.3–0.02% by weight, based on the weight of the monomer to be polymerized.

The following can be used as monomer-soluble initiators: diacyl peroxides, e.g., 2,4-dichlorobenzoyl, dibenzoyl, dilauroyl peroxide, etc.; peroxydicarbonates, e.g., diisopropyl, di-2-ethylhexyl, dicyclohexyl, dicetyl-peroxydicarbonate, etc.; alkyl peresters, e.g., tert-butyl perpivalate, tert-butyl perbenzoate, etc.; azo compounds, e.g., azobisisobutyronitrile [azodiisobutyric acid dinitrile] etc.; and finally mixed anhydrides of organic sulfo peracids and carboxylic acids, such as, for example, acetylcyclohexylsulfonyl peroxide, etc. The initiators can be utilized individually or in a mixture, customarily using amounts from 0.01 to 0.3% by weight, preferably 0.01–0.15% by weight, based on the amount of monomer.

The polymerization can be effected at customary temperatures in the range from 30° to 75° C., preferably 40°–70° C.

The use of up to 20% by weight of comonomers for the preparation of copolymers is feasible. Examples of suitable comonomers include vinyl esters, e.g., vinyl acetate, etc.; vinylidene halogenides, such as vinylidene chloride, etc.; acrylic acid alkyl esters and methacrylic acid alkyl esters of 1–18 carbon atoms in the alkyl residue, such as the methyl, n-butyl, and lauryl esters, etc.; and finally monoolefins, such as ethylene or propylene, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Comparative examples are denoted by capital letters.

EXAMPLE 1a

Preparation of
2-Isopropyl-$\Delta^2$-oxazoline/2-Ethyl-$\Delta^2$-oxazoline Copolymer The following compounds were introduced into a glass autoclave with heating jacket, equipped with a helical stirrer and a reflux condenser, at room temperature and under nitrogen:

| | |
|---|---|
| 550 ml | 2-isopropyl-$\Delta^2$-oxazoline |
| 50 ml | 2-ethyl-$\Delta^2$-oxaxoline (molar ratio: 90/10) |
| and 200 ml | p-xylene. |

Under agitation, 25.5 ml of a 0.1-molar solution of the methyl ester of p-toluenesulfonic acid in p-xylene was then added thereto. The pressure was set to a total pressure of 1.5 bar, and the thermostat connected to the heating jacket was set at 150° C. Within a heating-up time of 10 minutes, the internal temperature of the reactor reached 150° C. The polymerization was complete after about 60 minutes.

After pressure equilization, 700 ml of isopropyl alcohol was added to the reaction mixture. Thereafter the homogeneous, highly viscous solution was forced at 85° C. into a working-up apparatus wherein 3 liters of hexane had been provided. After agitation for one-half hour, 1 liter of hexane was additionally introduced. The product phase was separated from the solvent phase. The product was dissolved in methylene chloride, reprecipitated by adding hexane, and dried at 60° C./2 mbar. The thus-obtained product was utilized as the cosuspension stabilizer in combination with polyvinyl alcohol for the suspension polymerization of vinyl chloride according to Example 1b. The viscosity number of this product was 40 (ml/g), measured at 25° C. in an isopropanol/water mixture (50 vol-% of isopropanol), in a concentration of 0.5% (weight/volume of solution).

EXAMPLE 1b

The following components were introduced into a 40-liter polymerization autoclave of stainless steel: 20,000 parts of water, 12 parts of a partially hydrolyzed polyvinyl acetate with a degree of hydrolysis of 71.0±1.5 mole %, and a viscosity of 5.4±0.4 mPa.s (measured in a 4% by weight aqueous solution of 20° C.), 20 parts of the 2-isopropyl-$\Delta^2$-oxazoline/2-ethyl-$\Delta^2$-oxazoline copolymer prepared according to Example 1a, 9.35 parts of dicetylperoxydicarbonate, 11 parts of dilauroyl peroxide, and 4 parts of ammonium hydrogen carbonate. The autoclave was sealed, flushed with nitrogen, and evacuated. Then 10,000 parts of vinyl chloride was introduced. The polymerization was then conducted for 6 hours at a temperature of 54° C. and up to a pressure of 5 bar. The product was thereafter separated from the largest portion of the suspension water and dried at 50° C. in a fluidized-bed dryer.

As can be seen from Table 1, a polyvinyl chloride resin is obtained having a high porosity, a very low content of gels, and good specific volume resistivity values.

A similarly good result is obtained by using, instead of the partially hydrolyzed polyvinyl acetate, a methylhydroxypropyl-cellulose having a viscosity of 15 mPa.s, measured in a 2% by weight aqueous solution at 20° C.

A similarly satisfactory outcome is achieved as well by using, instead of 2-isopropyl-$\Delta^2$-oxazoline/2-ethyl-$\Delta^2$-oxazoline copolymer, a 2-n-propyl-$\Delta^2$-oxazoline/2-ethyl-$\Delta^2$-oxazoline copolymer prepared analogously to Example 1a.

EXAMPLE A

The procedure was followed as set out in Example 1b, but instead of 2-isopropyl-$\Delta^2$-oxazoline/2-ethyl-$\Delta^2$-oxazoline copolymer the same amount of sorbitan monolaurate was utilized (according to DOS No. 2,208,796). The product properties can be seen from Table 1. The thus-prepared polyvinyl chloride had a gel content which was higher by a multiple, and had a markedly lower porosity than the product prepared according to this invention by following Example 1b. Furthermore, the specific volume resistivity values were unsatisfactory.

EXAMPLE 2a

Preparation of 2-Isopropyl-$\Delta^2$-oxazoline/2-Methyl-$\Delta^2$-oxazoline Copolymer The procedure was similar to that in Example 1a, but 500 ml of 2-isopropyl-$\Delta^2$-oxazoline was employed instead of 550 ml, and 100 ml of 2-methyl-$\Delta^2$-oxazoline was used instead of 50 ml of 2-ethyl-$\Delta^2$-oxazoline (molar ratio: 78/22). The viscosity number of the product was 52 (ml/g), measured at 25° C. in an isopropanol/water mixture (50 vol-% of isopropanol), in a concentration of 0.5% (weight/volume of solution).

EXAMPLE 2b

The procedure of Example 1b was followed to conduct the suspension polymerization of vinyl chloride, but the suspension stabilizer employed herein was 5 parts of a partially hydrolyzed polyvinyl acetate with 71.0±1.5 mole % degree of hydrolysis, and with a viscosity of 5.4±0.4 mPa.s (measured in a 4% by weight aqueous solution at 20° C.), and the cosuspension stabilizer here was 15 parts of the 2-isopropyl-$\Delta^2$-oxazoline/2-methyl-$\Delta^2$-oxazoline copolymer prepared according to Example 2a.

As can be seen from Table 1, the thus-prepared polyvinyl chloride had a very porosity and a low gel content.

A similarly good result is attained by using, instead of the 2-isopropyl-$\Delta^2$-oxazoline/2-methyl-$\Delta^2$-oxazoline copolymer, a 2-n-propyl-$\Delta^2$-oxazoline/2-methyl-$\Delta^2$-oxazoline copolymer prepared analogously to Example 2a.

EXAMPLE B

The procedure was followed as set out in Example 2b, but an equal amount of sorbitan monolaurate was used in place of the 2-isopropyl-$\Delta^2$-oxazoline/2-methyl-$\Delta^2$-oxazoline copolymer employed according to this invention. The thus-produced polyvinyl chloride resin is extremely coarse and thus useless for the customary soft polyvinyl chloride processing method. The properties of the product are set forth in Table 1.

EXAMPLE C

The procedure of Example 2b was followed, but using as the suspension stabilizer 20 parts of a partially hydrolyzed polyvinyl acetate with a degree of hydrolysis of 71.0±1.5 mole % and a viscosity of 5.4±0.4 mPa.s (measured in a 4% by weight aqueous solution at 20° C.). Furthermore, in a deviation from Example 2b, the cosuspension stabilizer was omitted.

As can be seen from Table 1, the thus-prepared polyvinyl chloride resin had a low porosity and a very high gel content.

EXAMPLE 3

The process of Example 1b was followed, but using as the suspension stabilizer only 7.5 parts of a partially hydrolyzed polyvinyl acetate with a degree of hydrolysis of 71.0±1.5 mole % and a viscosity of 5.4±0.4 mPa.s (measured in a 4% aqueous solution at 20° C.) and as the cosuspension stabilizer 10 parts of the 2-isopropyl-$\Delta^2$-oxazoline/2-methyl-$\Delta^2$-oxazoline copolymer prepared according to Example 2a.

As can be seen from Table 1, the thus-prepared polyvinyl chloride resin had a high porosity, a low gel content, and high specific volume resistivity values.

A similarly good result is achieved by using, instead of the 2-isopropyl-$\Delta^2$-oxazoline/2-methyl-$\Delta^2$-oxazoline copolymer, a 2-n-propyl-$\Delta^2$-oxazoline/2-methyl-$\Delta^2$-oxazoline copolymer prepared analogously to Example 2a.

EXAMPLE D

The procedure of Example 3 was followed, but using as the suspension stabilizer 12 parts of a partially hydrolyzed polyvinyl acetate with a degree of hydrolysis of 71.0±1.5 mole % and a viscosity of 5.4±0.4 mPa.s (measured in a 4% aqueous solution at 20° C.), and employing, instead of the 2-isopropyl-$\Delta^2$-oxazoline/2-methyl-$\Delta^2$-oxazoline copolymer to be used according to this invention, the same amount of sorbitan monolaurate.

As can be seen from Table 1, the thus-produced polyvinyl chloride has a markedly lower porosity and a gel content which is higher by a multiple than the polyvinyl chloride resin produced according to this invention as set forth in Example 3.

TABLE 1

| Example | Particle Size Distribution Screening Residue in % by Weight with Following Mesh Widths: | | | | Bulk Density[1] (g/l) | Plasticizer Absorption[3] $\left(\frac{g\ DOP^{[2]}}{100\ g\ PVC}\right)$ | Period to Plasticizer Absorption[4] (min) | Evaluation of Fisheyes[5] | Specific Volume Resistivity ($\Omega \cdot cm$)[6] at | |
| --- | --- | --- | --- | --- | --- | --- | --- | --- | --- | --- |
| | 63 μm | 100 μm | 160 μm | 200 μm | | | | | 23° C. | 70° C. |
| 1b | 99.9 | 78.0 | 6.9 | 0.4 | 457 | 40.1 | 6.1 | 3.1 | $119 \cdot 10^{13}$ | $8.4 \cdot 10^{11}$ |
| A | 99.5 | 81.6 | 6.0 | 0.4 | 471 | 31.6 | 6.5 | 4.6 | $60 \cdot 10^{13}$ | $3.2 \cdot 10^{11}$ |
| 2b | 99.2 | 69.0 | 1.5 | 0.4 | 461 | 37.9 | 7.2 | 4.1 | — | — |
| B | 99.4 | 94.7 | 80.2 | 77.6 | 513 | 29.7 | | Not processable as soft PVC | | |
| C | 97.2 | 60.1 | 1.2 | | 459 | 27.6 | 7.5 | 5.6 | — | — |
| 3 | 99.5 | 72.7 | 0.8 | | 450 | 37.5 | 7.0 | 4.3 | $129 \cdot 10^{13}$ | $10.9 \cdot 10^{11}$ |
| D | 99.5 | 78.6 | 5.2 | 0.7 | 486 | 31.7 | 7.7 | 6.0 | $75 \cdot 10^{13}$ | $4.5 \cdot 10^{11}$ |

[1] According to DIN 53 468
[2] DOP = di-2-ethylhexyl phthalate
[3] According to DIN 53 417/1 (centrifiging method)—a measure for the grain porosity
[4] Time period up to the dry point of a PVC:di-2-ethylhexyl phthalate = 70:30 mixture, measured in a Brabender planetary mixer at 85° C.
[5] Testing method with a highly viscous polymeric adipic acid ester as the plasticizer. Comparison with standard samples, wherein 6 means an extremely high number, 3.5 an average number, and 1 an extremely low number of fisheyes. The intermediate figures are corresponding varying values. The indicated data are averaged from several evaluations of blown films extruded at three different screw speeds. Testing recipe: 70 parts PVC, 30 parts "Witamol 621", 4 parts "Nuostabe V 1204", 0.2 part LOXIOL G 40.
[6] According to DIN 53 482.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing a vinyl chloride resin by polymerizing vinyl chloride alone or with up to 20% by weight of other polymerizable unsaturated monomers, in an aqueous suspension, in the presence of a monomer-soluble free radical catalyst and a suspension stabilizer which is partially hydrolyzed polyvinyl acetate or cellulose ether, the improvement wherein the polymerization is conducted in the presence of 0.01-0.5% by weight, based on the amount of monomer to be polymerized, of a cosuspension stabilizer which is a copolymer of
    (a) 2-n-propyl-$\Delta^2$-oxazoline, 2-isopropyl-$\Delta^2$-oxazoline or both, and
    (b) 2-methyl-$\Delta^2$-oxazoline, 2-ethyl-$\Delta^2$-oxazoline or both,
the copolymer having a viscosity number of 35–70 (ml/g), measured at 25° C. in an isopropanol/water mixture (50 vol-% of isopropanol), in a concentration of 0.5% (weight/volume of the solution).

2. A process of claim 1, wherein the suspension stabilizer is 0.02–0.2% by weight, based on the amount of monomer, of a partially hydrolyzed polyvinyl acetate with a degree of hydrolysis of 70–90 mole % and a viscosity of 2–50 mPa.s, measured in a 4% by weight aqueous solution at 20° C.

3. A process of claim 1, wherein the suspension stabilizer is 0.02–0.3% by weight, based on the amount of monomer, of methyl-, methylhydroxyethyl-, or methylhydroxypropylcelluloses having a viscosity of 12–120 mPa.s, based on a 2% by weight aqueous solution at 20° C.

4. A process of claim 1, wherein the cosuspension stabilizer is a copolymer of 75–93 mole % of 2-isopropyl-$\Delta^2$-oxazoline and 25–7 mole % of 2-ethyl-$\Delta^2$-oxazoline, or a copolymer of 75–93 mole % of 2-isopropyl-$\Delta^2$-oxazoline and 25–7 mole % of 2-methyl-$\Delta^2$-oxazoline.

5. A process of claim 1, wherein the cosuspension stabilizer is a copolymer of 75–93 mole % of 2-n-propyl-$\Delta^2$-oxazoline and 25–7 mole % of 2-ethyl-$\Delta^2$-oxazoline or a copolymer of 75–93 mole % of 2-n-propyl-$\Delta^2$-oxazoline and 25–7 mole % of 2-methyl-$\Delta^2$-oxazoline.

6. A process of claim 1, wherein the viscosity number of the cosuspension stabilizer is 40–65 (ml/g).

7. A process of claim 1, wherein the cosuspension stabilizer is a copolymer of 75–85 mole % of 2-isopropyl-$\Delta^2$-oxazoline and 25–15 mole % of 2-methyl-$\Delta^2$-oxazoline.

8. A process of claim 1, wherein the cosuspension stabilizer is a copolymer of 77–87 mole % of 2-n-propyl-$\Delta^2$-oxazoline and 23–13 mole % of 2-methyl-$\Delta^2$-oxazoline.

9. A process of claim 1, wherein the amount of suspension stabilizer is 0.02 to 0.3% by weight, based on the weight of monomer.

10. A process of claim 1, wherein the cosuspension stabilizer is a copolymer of 87–95 mole % of 2-n-propyl-$\Delta^2$-oxazoline and 13–5 mole % of 2-ethyl-$\Delta^2$-oxazoline or a copolymer of 77–95 mole % of 2-n-propyl-$\Delta^2$-oxazoline and 23–5 mole % of 2-methyl-$\Delta^2$-oxazoline.

11. A process of claim 1 wherein the amount of said cosuspension stabilizer is 0.02–0.3% wt.

12. A process of claim 1 wherein the amount of monomer(s) (a) in the copolymer is 75–93 mole % and the amount of monomer(s) (b) in the copolymer is 25–7 mole %.

13. A process of claim 1 wherein said cosuspension stabilizer is prepared by a process of preparing a linear or slightly branched 2-($C_1$ to $C_3$ alkyl)-$\Delta^2$-oxazoline copolymer from a mixture of monomers more than 50 mole % of which is 2-(isopropyl- and/or n-propyl)-$\Delta^2$-oxazoline and less than 50 mole % of which is 2-(methyl- and/or ethyl)-$\Delta^2$-oxazoline, the copolymer having a viscosity number of 35 to 70 ml/g which is easily reproducible from batch to batch,
    comprising polymerizing the monomers in the presence of a cation-active catalyst whose anion is slightly nucleophilic,
    and wherein, (A) the monomers used as reagents contain less than 200 mg of water per liter of reagent and less than 0.003% by weight of basic nitrogen, the monomers being obtained by the following purification steps:
  (i) fractional distillation, optionally carried out after preaddition to the monomer reagent of an inert, organic solvent which acts as an entraining agent for impurities and which has a boiling point at least 15° C. lower at normal pressure than the monomer reagent, and optionally carried out at reduced pressure, which method can be applied to all monomers, or
  addition of an inert, organic solvent which acts as an entraining agent for impurities and which has a boiling point at least 15° C. lower at normal pressure than the monomer reagent; followed by distillation to extensively remove this solvent; subsequently followed by addition to the resultant sump product of from 0.01 to 2 parts by weight, referred to 100 parts by volume of the monomer reagent, of an aromatic isocyanate boiling at above 100° C./7 mbar; and ensuing fractional distillation at reduced pressure, which method can only be applied to 2-isopropyl-$\Delta^2$-oxazoline monomer reagent;
  (ii) subsequent contact with silica gel or neutral aluminum oxide, and
  (iii) optional drying above molecular sieve having a pore width of 0.3 to 0.4 nm;
(B) the polymerization is discontinuous and is carried out in a stirring vessel provided with a reflux condenser adequately dimensioned to remove the heat of polymerization by evaporative cooling;
(C) the polymerization temperature is from 120° to 175° C., and the temperature following the conversion of 90 mole-% of the monomers does not exceed 165° C., and
(D) the polymerization is stopped after a conversion of 96 to 99.5 mole-% of monomers has been reached.

* * * * *